United States Patent [19]

Orgun et al.

[11] Patent Number: 5,113,346
[45] Date of Patent: May 12, 1992

[54] AIRCRAFT AUTOMATIC LANDING SYSTEM WITH ENGINE OUT PROVISIONS

[75] Inventors: Munir Orgun, Woodinville; Timothy C. McRoberts, Bothell; Arvinder S. Virdee, Kirkland, all of Wash.

[73] Assignee: The Boeing Company, Seattle, Wash.

[21] Appl. No.: 470,647

[22] Filed: Jan. 26, 1990

[51] Int. Cl.⁵ .............................. G06F 15/50
[52] U.S. Cl. ............................. 364/428; 364/434; 364/435; 73/178 T; 244/183
[58] Field of Search ............... 364/435, 433, 434, 428; 73/178 T; 318/586; 244/181, 183

[56] References Cited
U.S. PATENT DOCUMENTS

| | | | |
|---|---|---|---|
| 4,354,237 | 10/1982 | Lambregts et al. | 364/428 |
| 4,538,229 | 8/1985 | Baltzer et al. | 73/178 T |
| 4,763,266 | 8/1988 | Schultz et al. | 364/428 |
| 4,841,448 | 6/1989 | Ford | 73/178 T |
| 4,935,682 | 6/1990 | McCuen | 318/586 |

Primary Examiner—Gary Chin
Attorney, Agent, or Firm—Christensen, O'Connor, Johnson & Kindness

[57] ABSTRACT

Disclosed is a method of and apparatus for processing flight control signals in an automatic landing system so that automatic landings can be executed within the bounds of current certification requirements (Category III weather minimums) and in a manner that in effect emulates standard manual landing procedures. Included is provision for introducing engine-out sideslip that insures that the automatic landing approach and touchdown is made with the aircraft wings level or with the upwind wing low. Also provided is the generation of rudder and wheel (aileron) compensation for lateral ground effects that occur during a landing with sideslip when the aircraft altitude is approximately one wingspan or less. Provision also is made for rudder control to offset yawing moment that occurs when the thrust of the operative engines is retarded prior to touchdown. A two stage alignment procedure is provided for use in both engine-out automatic landings and normal automatic landings to decrab the aircraft throughout a moderately light to relatively high crosswind range.

28 Claims, 6 Drawing Sheets

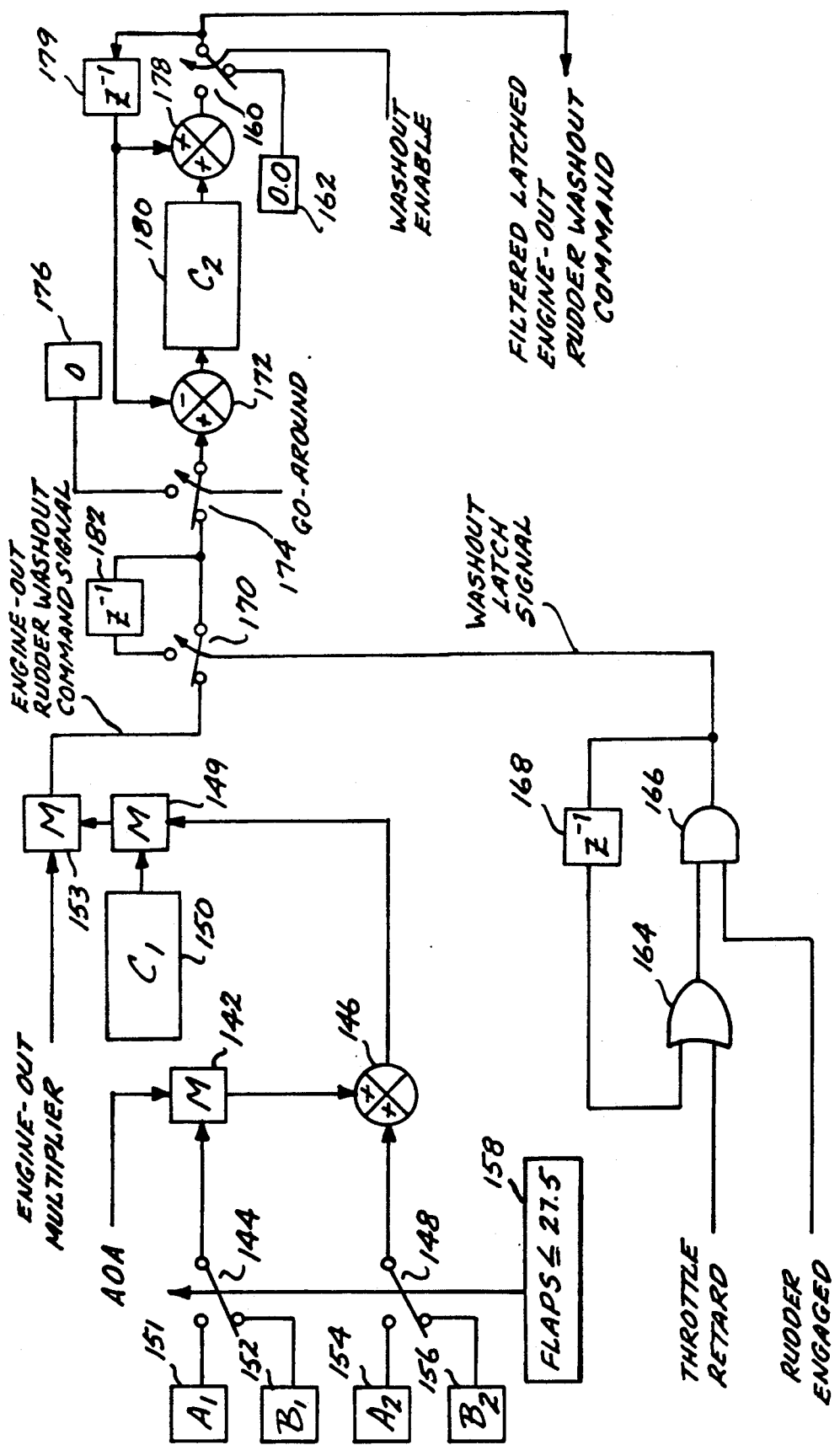

AIRCRAFT AUTOMATIC LANDING SYSTEM WITH ENGINE OUT PROVISIONS

TECHNICAL FIELD

This invention relates to automatic landing systems for multiengine aircraft and, more particularly, to a method and apparatus that allows such a system to land the aircraft when one of the engines is inoperative.

BACKGROUND OF THE INVENTION

Various automatic landing systems have become available during the past several years, often being incorporated in the aircraft autopilot or flight control system. Basically, these automatic landing systems are digital signal processors that execute control laws that cause the aircraft to follow glideslope and localizer signals so that the aircraft approaches the destination runway without manual control by the pilot. When the aircraft reaches a suitable point in its descent, the automatic landing system initiates a flare maneuver to arrest aircraft rate of descent (sink rate) so that the aircraft touches down on the runway at a proper position and at a suitable sink rate. The system then maintains the aircraft in a suitably straight path throughout the rollout landing phase by operating the aircraft control surfaces.

Although significant advances have been made in automatic landing system performance, the prior art has not provided a system that satisfactorily executes automatic landings when one of the aircraft engines has failed or has otherwise become inoperative prior to the time at which the landing is to be executed. Specifically, although some prior art systems may be capable of safely landing the aircraft with an engine inoperative, overall engine-out landing performance of such systems is such that the systems do not meet the all weather certification requirements of the aviation authorities (e.g., current Category III weather minimums). As is known in the art, these certification requirements impose limits or bounds on performance factors such as landing length, the point at which the aircraft must touch down after crossing runway threshold, the position of the aircraft relative to the runway center line at the point of touchdown and the amount of variation that is allowable relative to straight line travel during rollout.

To be of value in service and, as a practical matter, to qualify for certification, an automatic landing system must not only meet the formal certification requirements, but must also be acceptable to the vast majority of the pilots that fly the aircraft. In particular, unless the automatic landing system maneuvers the aircraft in a manner that substantially corresponds to standard manual flight practice, the pilot may become unduly concerned during an automatic landing procedure. Such concern may cause the pilot to assume manual control, even in situations in which the automatic landing is being made under low visibility conditions.

By way of example, some prior art systems that meet normal certification requirements (landings with all engines operative) exhibit an engine-out characteristic that is disfavored by pilots. In particular, if such an automatic landing system is engaged with one engine inoperative, the system places the aircraft in a "failed engine high" configuration. That is, the aircraft will roll slightly with the wing on which the operative engine or engines is/are mounted being lower than the wing on which the inoperative engine is located. This aircraft attitude is not generally acceptable to pilots in the event of cross wind conditions under which the wind direction is from the same side as the failed engine. Specifically, standard flight procedure for landings with an inoperative engine calls for the aircraft to be maneuvered and landed with the upwind wing low, thus maintaining maximum aircraft stability and control handling characteristics during touchdown and rollout.

SUMMARY OF THE INVENTION

Provided in accordance with this invention are methods and arrangements for processing flight control data in an automatic landing system so that automatic landings can be executed within the bounds of current certification requirements and in a manner that in effect emulates standard manual landing procedures. One aspect of the invention is control of the aircraft so that the automatic landing approach and touchdown is made with the wings level or with the upwind wing low even if the direction of the crosswind should change during the landing procedure (e.g., if lateral windshear is encountered). This conforms with standard flight practices. A second aspect of the invention is compensation for lateral ground effects that occur during a landing when the aircraft altitude is approximately one wingspan or less. Absent compensation, sideslip of the aircraft in the presence of these lateral ground effects can result in significant rolling and yawing moments which lift the upwind wing and turn the aircraft nose away from the runway center line. The compensation provided in accordance with the invention is of importance relative to meeting certification requirements that relate to the distance between the point of aircraft touchdown and the center line of the runway. Since the lateral ground effects compensation provided by the invention assist in maintaining the aircraft aligned with the runway under all wind conditions, large side forces on the aircraft landing gear are avoided. This results in less tire wear (lower operating costs) and avoids subjecting passengers to substantial side forces that can cause unnecessary alarm and discomfort.

In accordance with another aspect of the invention, compensation is provided for the significant yawing moment that is generated in an engine out landing when, just prior to touchdown, the thrust of the remaining engines is retarded in accordance with normal landing practice. Without compensation such as is provided by the invention, significant variation can be encountered relative to the distance between aircraft touchdown and the runway center line and there may be large deviations in the distance between the aircraft and the runway center line during aircraft rollout.

In addition, the currently preferred embodiments of the invention include two stage alignment of the aircraft under crosswind approach conditions. Specifically, it is known in the prior art to induce sideslip to align the aircraft with the runway during crosswind approaches (i.e., decrab). However, the practice in prior art automatic landing systems has been to attempt to decrab the aircraft only in the presence of relatively high crosswinds (i.e., when the crab angle is in excess of a predetermined value). In the currently preferred embodiments of the invention, the prior art compensation for relatively high crosswinds is supplemented with compensation for low and moderate levels of crosswinds (i.e., crab angles less than those accommodated by the prior art). This additional alignment contributes to the invention's avoidance of pilot disfavored upwind wing high landings, and is important both in meeting the previously mentioned requirement that the aircraft touch down within a certain distance of the runway center line and in reducing side forces on the landing gear when the aircraft touches down.

As can be appreciated from the foregoing brief summary, the invention provides numerous benefits. Of primary benefit is the ability to make an unscheduled landing after an engine has failed even though adverse weather conditions exist at the landing facility. This can substantially shorten the amount of time the aircraft must remain airborne after experiencing an engine failure and avoid the cost of diverting the aircraft to a distant, secondary airport. A benefit of a related nature is extended flexibility relative to operation of the aircraft over long range routes in which there may be few alternative landing facilities. With current automatic landing systems that are not equipped for an engine out landing, aircraft departure usually must be delayed in the event of adverse weather conditions at the destination facility or alternative landing facilities along the flight route. When equipped for automatic landings with an inoperative engine, the aircraft most often can be dispatched without delay. This results in reduced operating costs for the operator of the aircraft and in greater convenience for passengers.

BRIEF DESCRIPTION OF THE DRAWING

These and other aspects and advantages of the invention will be more fully understood in view of the following description when taken in conjunction with the drawing in which:

FIG. 6 is a block diagram that illustrates the signal processing utilized by the invention to produce a rudder washout signal that compensates for yawing moment produced when the thrust of the operative engines is retarded during the automatic landing flare maneuver with an engine inoperative.

DETAILED DESCRIPTION

Figure 1:
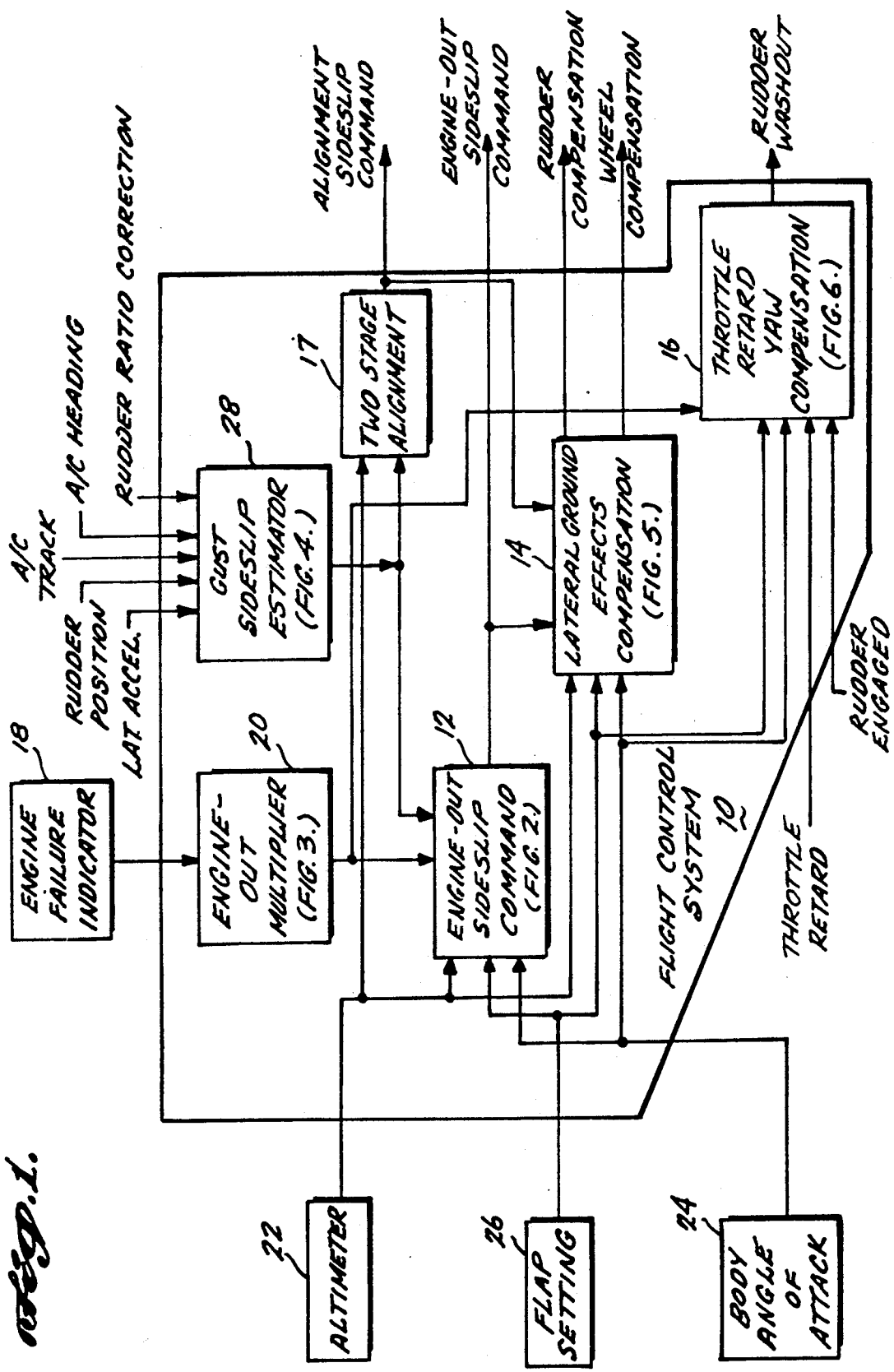
FIG. 1 is a block diagram that generally depicts various signal processing arrangements of the invention incorporated in an automatic landing system.

FIG. 1 is a block diagram that generally depicts the invention embodied in an aircraft flight control system 10. As is known in the art, modern flight control systems such as automatic landing systems and autopilots that incorporate automatic landing provisions basically are digital data processors that are programmed to effect required navigation and flight control laws. Although not shown in FIG. 1, it will be recognized that such flight control systems include addressable memory for storing program instructions and data and a computational unit for performing required arithmetic and logic operations. The signal processing of the invention, which primarily is described in terms of various control laws and operations, is readily implementable in such a system. Alternatively, if desired, at least a portion of the invention may be implemented by logic gates and other known circuit elements.

Four features of the invention are generally indicated in FIG. 1: (a) engine-out sideslip command signal generation (block 12); (b) lateral ground effects compensation (block 14); (c) throttle retard yaw compensation (block 16); and two stage alignment block 17. The method employed by the invention in generating the engine-out sideslip command signal generally comprises engaging the system when one of the engines is inoperative (indicated by engine failure indicator 18 and engine out multiplier 20) when the aircraft begins an automatic landing procedure and reaches a predetermined altitude such as 1300 feet (indicated in FIG. 1 by altimeter 22). With the system activated, a signal representative of the aircraft body angle of attack (indicated at block 24) is processed by, in effect, multiplying the angle of attack signal by a multiplicative value and by adding to the product of the angle of attack and multiplicative value an additive value. Since the sideslip command required is a function of aircraft flap setting (indicated at block 26), a first multiplicative value and additive value is utilized when the landing is being made with what is conventionally referred to as 25° flap setting and a second multiplicative value and additive value is used when the landing is being made with what conventionally is identified as a 30° flap setting. The signal that is generated by processing the angle of attack signal then is multiplied by an engine out multiplier (block 20) so that the engine-out sideslip command signal will induce sideslip in the proper direction and at a magnitude that is properly scaled in accordance with the location of the inoperative engine. When the crosswind is from the same side of the aircraft as the inoperative engine, the signal produced by the above-described signal processing is filtered and supplied as the engine out sideslip command to place the aircraft in a wings level or an upwind wing low configuration on approach. Rate limiting is incorporated in the filtering process to prevent abrupt changes in sideslip command that could exert disconcerting forces on aircraft passengers. In addition, in the currently preferred embodiments of the invention, under some crosswind conditions, an engine-out sideslip command signal is generated when the wind direction is from the side of the aircraft that is opposite the inoperative engine. Specifically, under such wind conditions, the invention operates to subtract from the engine-out sideslip command signal that is generated in the previously described manner a gust sideslip estimation (indicated at block 28 in FIG. 1). Operating in this manner, the invention corrects for changes in crosswind direction relative to the failed engine, including those that result because of lateral windshear.

Figure 2:
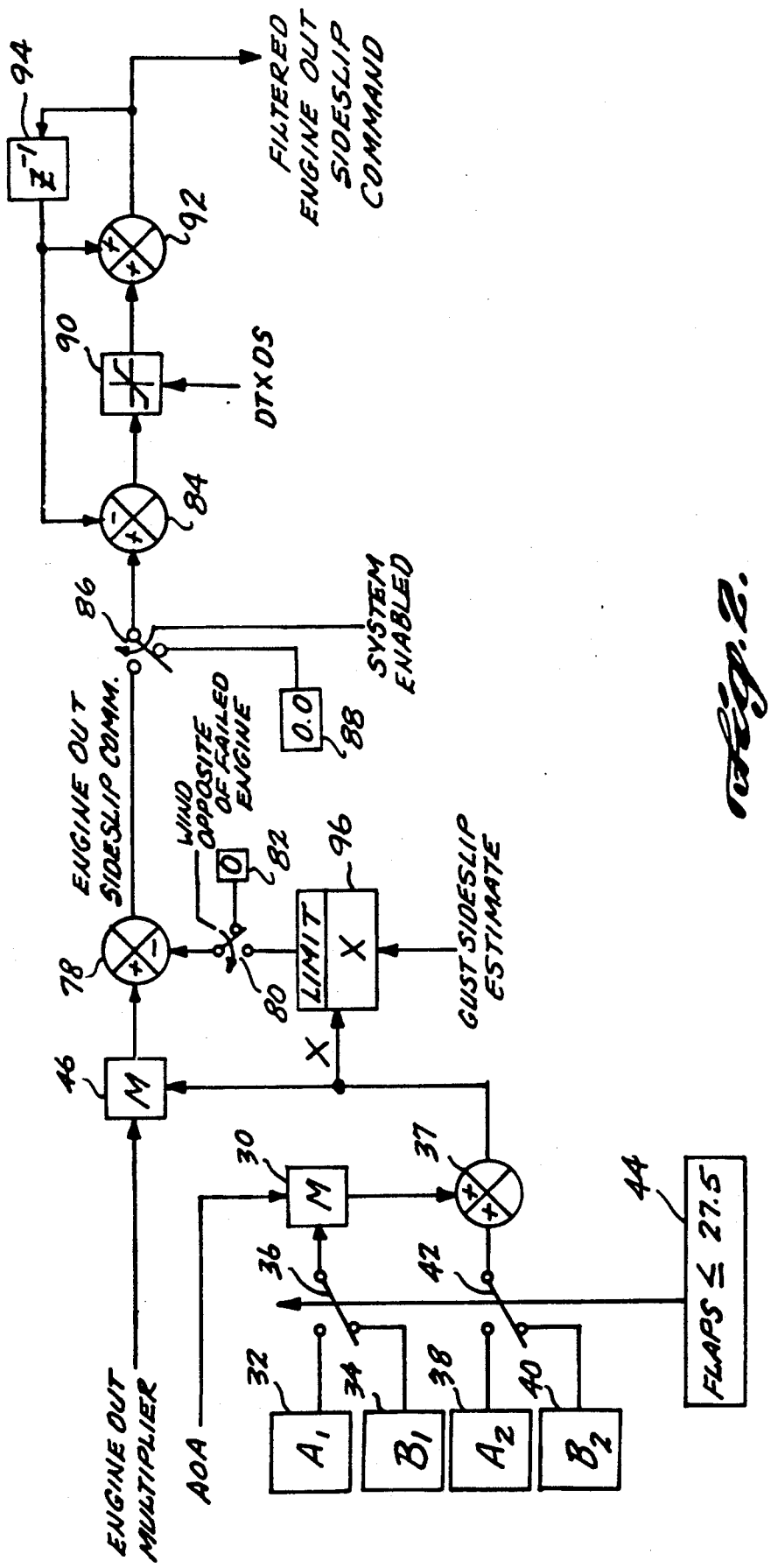
FIG. 2 is a block diagram that illustrates the manner in which the invention generates an engine out sideslip command signal to maintain the aircraft in a level or upwind wing down attitude during the landing approach and touchdown.
Figure 4:
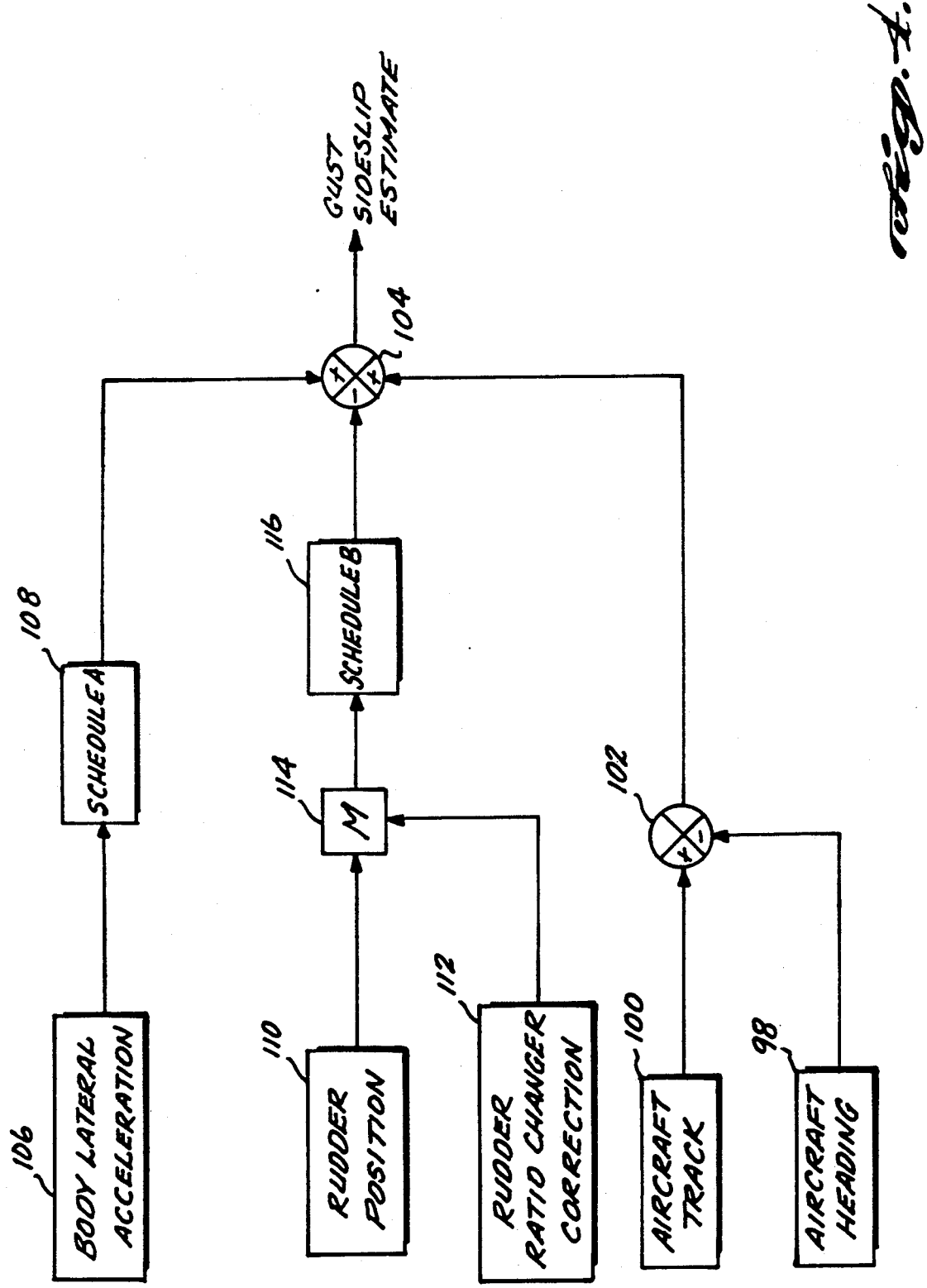
FIG. 4 is a block diagram that illustrates the signal processing used to produce a gust sideslip estimate signal that is employed in the sideslip command arrangement of FIG. 2 and FIG. 6.

As shall be described relative to FIGS. 2 and 4, the gust sideslip estimation is a real time estimate of the airplane crab angle that is attributable purely to the existing crosswind. That is, the gust sideslip estimate does not reflect reduction in crab angle that results from sideslip. In accordance with the invention, prior to subtracting the gust sideslip estimation from the engine-out sideslip command signal, the gust sideslip estimate is limited so that its magnitude cannot exceed the magnitude of the sideslip command signal that exists at this stage of the signal processing. Thus, the magnitude of the sideslip command signal that exists after subtraction of the gust sideslip estimate will be zero for relatively strong crosswind and will increase for moderate to light crosswind. Generating the engine-out sideslip command signal in this manner when the crosswind direction is from the side of the aircraft opposite to the failed engine ensures that the aircraft will approach and touch down on the runway in an upwind wing low configuration under moderate and light crosswind conditions.

As is indicated at block 14 of FIG. 1, the lateral ground effects compensation provision of the invention produces a rudder compensation signal and a wheel (aileron) compensation signal, which respectively counteract yawing moments and rolling moments that occur just prior to the time at which an aircraft that is landing with sideslip touches down on the runway (aircraft gear altitude of approximately one wingspan and less). As is indicated in FIG. 1, and as shall be described in more detail relative to FIG. 5, the amount of rudder and wheel compensation generated by the invention is dependent upon aircraft flap setting, altitude, body angle of attack and total sideslip (i.e., sideslip due to both the generated engine-out sideslip command signal and alignment-induced sideslip, which is indicated by the gust sideslip estimate discussed relative to block 28 of FIG. 1).

As is indicated at block 16 of FIG. 1, the yaw compensation signal generated by the invention when thrust of the operative engines is retarded consists of a rudder washout signal that is dependent upon aircraft body angle of attack, the engine out multiplier (block 20; discussed relative to sideslip command signal generation), and landing flap setting. In the currently preferred embodiments of the invention, the amount of rudder command washed out at throttle retard is determined in a manner similar to the signal processing utilized to generate the engine out sideslip command. The rudder washout command signal generated in that manner is then processed to implement first order washout in which the filter time constant is established for optimal performance relative to uncertainty as to the altitude at which throttle retard may occur and engine response characteristics to throttle command.

The previously described signal processing that is implemented by the invention to produce the engine out sideslip command signal can be more fully understood with reference to FIG. 2. Referring to FIG. 2, it can be seen that the engine out sideslip command produced by the invention is scheduled with respect to aircraft body angle of attack for each of the two conventional landing flap settings (flaps 25° and flaps 30°). More specifically, in the signal processing representation of FIG. 2, a multiplier 30 multiplies the angle of attack signal (AOA) by a multiplicative factor $A_1$ or a multiplicative factor $B_1$, depending upon the position of a switch 36. The product of the multiplicative factor ($A_1$ or $B_1$) and the angle of attack signal is supplied to a summing network 37 and added either to an additive factor $A_2$ or to an additive factor $B_2$, depending upon the setting of a switch 42. As is indicated at block 44 in FIG. 2, the depicted switches 36 and 42 are operated in accordance with flap position. Specifically, for landing flap position 25° (i.e., flaps less than or equal to 27.5° in FIG. 2), the signal provided by summing network 37 corresponds to $A_1 AOA + A_2$. When the landing flap setting is 30°, the signal provided by summing network 37 corresponds to $B_1 AOA + B_2$.

In the practice of the invention, $A_1$ and $A_2$ respectively are the slope and intercept values for a linear relationship that closely approximates the amount of sideslip command necessary to force the aircraft wings level as the aircraft descends along a 3° glideslope (nominal glideslope angle) with a 25° flap setting and one engine inoperative. To ensure maximum accuracy, this linear approximation should take into account various landing conditions such as aircraft weight, variation in the aircraft center of gravity, and various approach speeds. Similarly, $B_1$ and $B_2$ respectively are the slope and intercept values for a straight-line approximation to the amount of sideslip command necessary to force the aircraft wings level for landings executed with a 30° flap setting and under the above-mentioned conditions.

It will be recognized that various analytical and empirical methods can be employed to determine the above-discussed multiplicative and additive factors for any particular type of aircraft that incorporates the invention. For example, during development of the invention and the attendant determination of the above-discussed multiplicative and additive factors, a number of landing conditions were considered that, in effect, define the entire landing envelope of the type of aircraft in which the invention was to be reduced to practice. These landing conditions took into account the two conventional flap settings, maximum and minimum landing weights, maximum forward and aft location of center of gravity, nominal approach speed and two approach speeds that exceeded nominal approach speed. A flight simulator was then employed to determine the sideslip command signal required to maintain the aircraft at zero bank angle as it descended along a 3° glideslope with an inoperative engine under each of the landing conditions. The data were then analyzed for 25° flap setting and 30° flap setting to obtain the multiplicative factors shown in FIG. 2.

Figure 3:
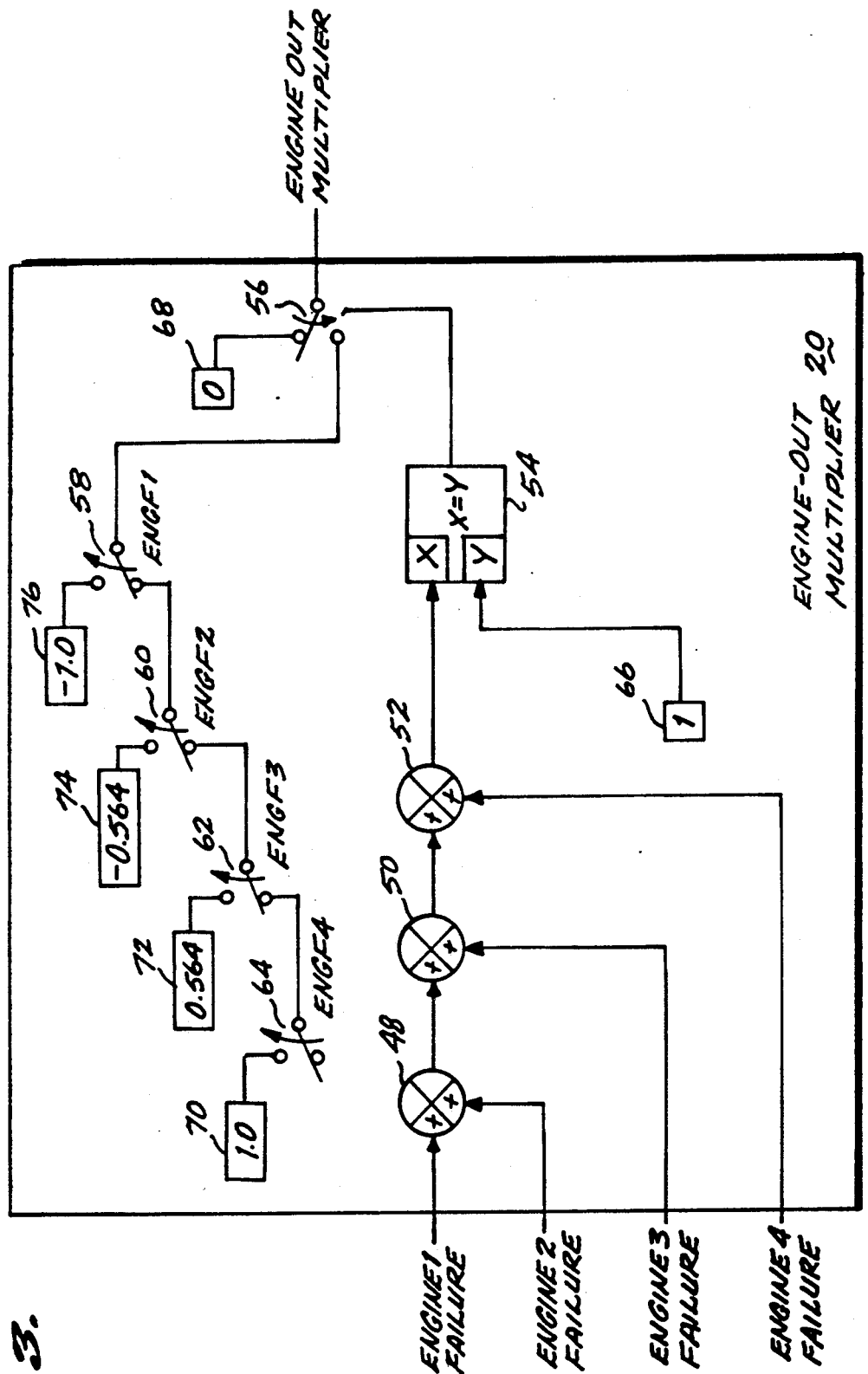
FIG. 3 is a block diagram depicting the processing of engine failure signals to provide an engine out multiplier signal that is utilized in the sideslip command arrangement of FIG. 2.

Regardless of the exact manner in which the multiplicative factors shown in FIG. 2 are determined, the signal provided by summing network 37 of FIG. 2 is then multiplied by the previously discussed engine out multiplier. This step of the signal processing is indicated by multiplier 46 in FIG. 2. In the currently preferred embodiments of the invention, for twin-engine aircraft, engine out multiplier 20 of FIG. 1 provides an engine out multiplier equal to −1 if the left engine is inoperative (engine number 1) and provides an engine out multiplier equal to +1 if the right engine is inoperative (engine number 2). When the invention is used in an aircraft equipped with four engines, the currently preferred embodiments of engine out multiplier 20 perform signal processing that: ensures that the automatic landing system will not attempt an engine out landing with more than one inoperative engine; determines which engine is inoperative and, based on that determination, supplies the appropriate engine out multiplier. As is shown in FIG. 3, the signal processing for such a four-engine engine out multiplier can be effected by an arrangement of three additive summing networks (48, 50, 52); a comparator 54; and five switches (56, 58, 60, 62 and 64). In the depicted arrangement, the output of the first summing network 48 is connected to one input of the second summing network 50 and the output of the second summing network 50 is connected to one input of the third summing network 52. Engine failure signals for each of the four engines are supplied to the remaining inputs of summing networks 48, 50 and 52. These signals, which can be obtained from the aircraft automatic throttle system or equivalent source, are logically true (i.e., are equal to 1) when the engine associated with the engine failure signal is inoperative. Thus, summing network 52, which is coupled to one input of comparator 54, will supply a signal equal to 1 if and only if there is a single inoperative engine.

In the arrangement of FIG. 3, the second input terminal of comparator 54 is connected for receiving a signal equal to 1 (indicated at block 66) and the output signal provided by comparator 54 operates switch 56. When all four engines are operative or more than one engine has failed (switch 56 not activated by comparator 54), the engine out multiplier is set equal to 0 (indicated at block 68). This ensures that the sideslip command signal arrangement of FIG. 2 will not produce engine-out sideslip command if no engines are inoperative or if more than one engine is inoperative. On the other hand, when switch 56 is activated by comparator 54 (one and only one engine inoperative), the engine out multiplier supplied to the sideslip command signal arrangement of FIG. 2 is determined by the settings of switches 58, 60, 62 and 64. As is indicated in FIG. 3, each of these four switches is activated when an associated engine is inoperative. In addition, the switches are interconnected so that: an engine out multiplier equal to 1 (indicated at block 70) is supplied when engine number 4 is inoperative (starboard outboard engine); an engine out multiplier equal to $-1$ (indicated at block 76) is supplied when engine number 1 is inoperative (port outboard engine); and engine out multipliers respectively equal to $-0.564$ (indicated at block 74) and 0.564 (indicated at block 72) are supplied for an inoperative engine number 2 (port inboard engine) and an inoperative engine number 3 (starboard inboard engine). It should be noted that the values of engine out multipliers for the two inboard engines are based on engine mounting geometry (i.e., the location of the inboard engines relative to the location of the outboard engines). Thus, values different from those shown in FIG. 3 may be employed, depending on the particular aircraft of interest.

Referring again to the engine out sideslip command arrangement shown in FIG. 2, when the crosswind is from the same side of the aircraft as the failed engine, the signal that results from the engine out multiplier scaling (provided by multiplier 46 in FIG. 2) is filtered and supplied as the engine out sideslip command signal. More specifically, in the arrangement of FIG. 2, the signal supplied by multiplier 46 is coupled to an additive (+) input of a summing network 78. A switch 80 is connected to a negative ($-$) input of summing network 78. As is indicated in FIG. 2 and as shall be described in more detail, switch 80 is activated by a signal that indicates crosswind direction from the side of the aircraft opposite to the side on which the failed engine is mounted. When switch 80 is not activated (crosswind from the same side of the aircraft as the failed engine), a value of 0 (indicated at block 82) is supplied to the negative ($-$) input of summing network 78. When this is the case, the engine out sideslip command is not altered by summing network 78 and the sideslip command signal is coupled to an additive (+) input of summing network 84 via a switch 86, which is activated at all times at which the automatic landing system is enabled.

As is indicated in FIG. 2, switch 86 couples a signal equal to 0 (indicated at block 88) to the additive (+) input of summing network 84 if the automatic landing system is disengaged. As shall be recognized upon understanding the manner in which the sideslip command signal is filtered and rate-limited, supplying a signal equal to 0 to summing network 84 upon system disengagement (i.e., system failure or pilot intervention), causes the sideslip command signal to smoothly ramp to the value of 0. This smooth transition eliminates an abrupt change in aircraft sideslip, thus ensuring that passengers are not subjected to significant side forces that could lead to discomfort or undue concern.

The above-mentioned filtering and rate limiting of the sideslip command signal is provided in FIG. 2 by a recursive digital filtering arrangement that includes: summing network 84; a second summing network 92, which provides the filtered engine out sideslip command signal; a limiter circuit 90 connected between the output of summing network 84 and an additive (+) input of summing network 92; and a Z-transform block 94, which is shown as receiving an input signal from the output of summing network 92 and as supplying signals to a subtractive ($-$) input of summing network 84 and an additive input of summing network 92. During each iteration period in which signals are supplied to the additive input terminal of summing network 84, Z-transform block 94 supplies a signal representative of the filter output during the next most antecedent iteration period. Thus, summing network 84 provides a signal representative of the rate at which the filter input signal is changing relative to the filter output signal. As is indicated by the depicted graphic representation of a transfer function, limiter 90 produces an output signal that is equal to the rate signal supplied by summing network 84 for all input signal values that are less than or equal to a predetermined value. As is indicated in FIG. 2, the limiting value is the product of the iteration period (DT) and the desired maximum rate of change in the filter output signal (DS). Since the inputs of summing network 92 are provided with the output of limiter 90 and a signal representative of the filtered engine out sideslip command signal during the next most antecedent iteration period, summing network 92, in effect, functions as an integrator, adding the rate signal supplied by limiter 90 to the value of the filter output during the next most antecedent filter iteration period.

As thus far described, the signal processing effected by the arrangement of FIG. 2 generates a rate-limited, filtered engine out sideslip command signal that will maintain the aircraft in a wings level or upwind wing low configuration when one of the aircraft engines is inoperative during an automatic landing procedure. This provision of the invention thus eliminates the previously discussed drawbacks and disadvantages of prior art automatic landing systems in which the aircraft always assumed a "failed engine high" attitude.

As was previously mentioned, the currently preferred embodiments of the invention also include a provision for supplying an engine out sideslip command signal that ensures an upwind wing low landing when an automatic landing is executed with low or moderate crosswind from the opposite side of the aircraft from the failed engine. In the arrangement of FIG. 2, when the wind is from the side of the aircraft opposite to the failed engine, switch 80 is activated to connect the subtractive ($-$) input of summing network 78 to the output terminal of a limiter 96. One input terminal of limiter 96 is connected for receiving the signal supplied by summing network 37 (i.e., a signal representative of the maximum engine-out sideslip command for the aircraft flap setting and the angle of attack). The second input terminal is connected for receiving the gust sideslip estimate, which as previously mentioned is representative of crosswind induced aircraft crab angle. That is, as shall be described relative to FIG. 4, the gust sideslip estimate signal (indicated at block 28 in FIG. 1) is generated in a manner that in effect subtracts sideslip induced crab angle from the apparent crab angle (aircraft track - aircraft heading).

As is indicated in FIG. 2, limiter 96 provides a signal (to the subtractive (−) input of summing network 78) that is equal to the gust sideslip estimate for all values of gust sideslip estimate that are equal to or less than the signal supplied by summing network 37. If the gust sideslip estimate signal exceeds the signal supplied by summing network 37, the signal supplied to the subtractive (−) input of summing network 78 remains constant at the signal level established by summing network 37. Since the gust sideslip estimate increases with increasing crab angle, under crosswind conditions in which the wind direction is from the opposite side of the aircraft than the failed engine, summing network 78 produces an engine-out sideslip command signal only for relatively light and moderate crosswinds (relatively small crosswind induced crab angles). This engine-out sideslip command signal is then filtered and rate limited to supply a signal that establishes an upwind wing low aircraft attitude.

FIG. 4 illustrates a gust sideslip estimator that is suitable for use in the practice of this invention and has been used by the assignee of this invention with respect to automatic landing provisions of large transport aircraft. In the depicted arrangement of FIG. 4, a signal representative of the aircraft heading (indicated at block 98) is subtracted from a signal representative of the aircraft track (indicated at block 100), with the operation of subtraction being represented in FIG. 4 by summing network 102. This signal, which indicates the apparent crab angle of the aircraft, i.e., the sum of the crosswind induced crab angle and sideslip induced crab angle, is supplied to an additive (+) input of a summing network 104. Supplied to a second additive (+) input of summing network 104 and a subtractive (−) input of summing network 104 are signals that, in combination, account for sideslip induced crab angle.

The signal supplied to the second additive (+) input of summing network 104 is derived from a signal representative of the aircraft lateral body acceleration (which can be supplied by the aircraft inertial reference system; indicated at block 106). Specifically, the lateral acceleration signal is processed in accordance with a schedule (schedule A at block 108 in FIG. 4), which relates aircraft lateral body acceleration to sideslip induced crab angle. Schedule A is dependent upon the aerodynamic characteristics of the aircraft type and can be determined by conventional means such as a six-degree of freedom analysis of the aircraft flight characteristics.

The signal supplied to the subtractive (−) input of summing network 104 is derived from a signal representative of the aircraft rudder position (indicated at block 110) and a signal representative of the rudder ratio changer correction (indicated at block 112). As is known in the art, use of a rudder ratio changer correction is a conventional technique that establishes a rudder control signal that is compensated for decreased rudder effectiveness that occurs in the lower portion of the aircraft's airspeed range. As is indicated in FIG. 4, to produce a signal for use in gust sideslip estimation, a signal representative of rudder position is multiplied by the rudder ratio changer correction (indicated by multiplier 114 in FIG. 4) and the product of the two signals is processed in accordance with a schedule that relates rudder position to sideslip induced crab angle (indicated by schedule B in FIG. 4; block 116). Schedule B, which relates the compensated rudder position signal to sideslip induced crab angle, is dependent upon the aircraft type and can be determined in a manner similar to schedule A.

Figure 5:
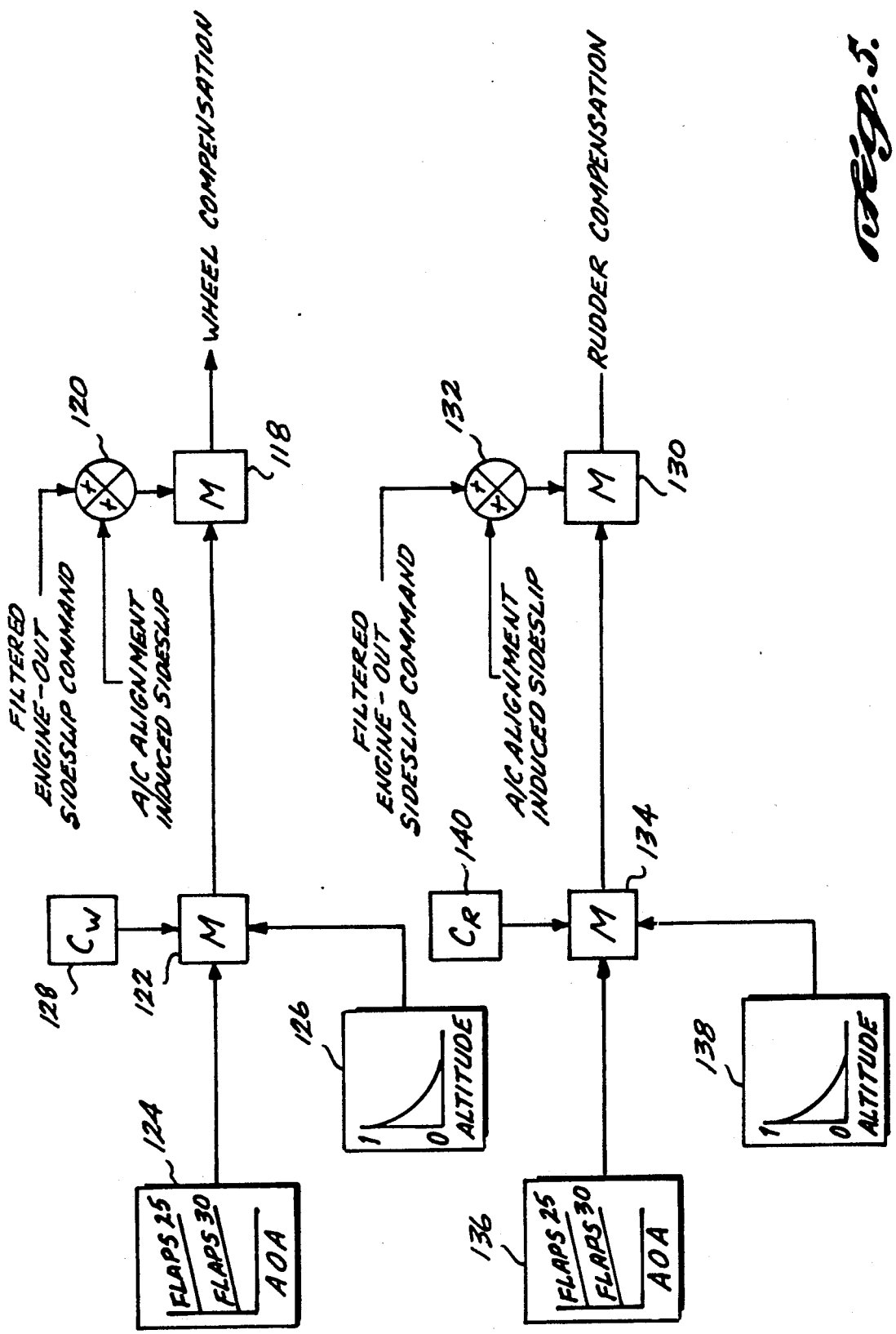
FIG. 5 is a block diagram that illustrates the wheel (aileron) compensation and rudder compensation that is generated by the invention to compensate for lateral ground effects during the final phases of the automatic landing.

The gust sideslip estimator of FIG. 4 produces a positive output signal for crab angles that result from crosswind from the left-hand side of the aircraft and produces negative gust sideslip estimate signals when the crosswind is from the right-hand side of the aircraft. In the currently preferred embodiments of the invention, the sign (polarity) of the gust sideslip estimate is used in conjunction with the sign (polarity) of the engine-out multiplier that was discussed relative to FIG. 3 to produce a signal that indicates wind direction relative to the inoperative engine (e.g., a signal for activating switch 80 of FIG. 2). In particular, if a negative engine-out multiplier (for a port side engine failed) is treated as a logical 0 and a positive engine-out multiplier (starboard engine failure) is treated as a logical 1, while simultaneously treating negative values of gust sideslip estimate as logical 0's and positive values of gust sideslip estimate as logical 1's, a signal representative of whether the crosswind is from the opposite (or same) side of the aircraft as the failed engine easily can be obtained. For example, in the currently preferred embodiments of the invention in which the gust sideslip estimate signal is positive (logical 1) for winds from the port side of the aircraft, a signal indicating that the wind is from the opposite side of the aircraft than the failed engine can be obtained through standard implementation of the logical expression Engine-out Multiplier $<0 \oplus$ Gust Estimate $<0$ FIG. 5 illustrates the manner in which the currently preferred embodiments of the invention implement the lateral ground effects compensation that was briefly described relative to block 14 of FIG. 1. In FIG. 5, the arrangement for generating wheel (aileron) compensation includes a multiplier 118 having one input connected to the output of a summing network 120. As is indicated in FIG. 5, the signal provided by summing network 120 represents the total commanded aircraft sideslip. That is, summing network 120 provides the sum of the filtered engine-out sideslip command signal (i.e., the signal generated by the arrangement of FIG. 2) and a signal representative of the sideslip induced by the automatic landing system in executing an alignment maneuver.

Connected to the second input of the multiplier 118 is the output of a multiplier 122. Multiplier 122 produces a signal representative of the ground effects wheel compensation required per degree of sideslip, which is dependent upon aircraft angle of attack, landing flap setting and altitude. As is indicated in FIG. 5, the relationship between wheel position change and angle of attack for flap setting 25° and flap setting 30° can be represented as a schedule that establishes an input to multiplier 122 for the flap setting being employed and the aircraft angle of attack during the landing procedure. As is known in the art, such a schedule can be stored as a look-up table in the automatic landing system. Alternatively, when the relationship for both a flap setting of 25° and a flap setting of 30° is substantially linear, a signal representative of the aircraft angle of attack can be processed for flap setting 25° and flap setting 30° in the manner discussed relative to FIG. 2.

To account for the altitude dependency, multiplier 122 in FIG. 5 also is supplied with an altitude scale factor, which is graphically depicted at block 126. As is indicated by the graphical depiction of block 126, the relationship between the altitude scale factor decreases from unity in a substantially exponential manner as a function of altitude, reaching 0 at an altitude that is approximately equal to the aircraft wingspan. Like the schedule shown at block 124, the altitude factor schedule can be stored in the form of a look-up table in the automatic landing system memory, or, alternatively, can be generated by other appropriate means.

As also is indicated in FIG. 5, a signal representative of a constant $C_W$ is supplied to a third input of multiplier 122. The constant $C_W$ is selected for optimal ground effects wheel compensation and can be determined empirically. In one realization of the invention, optimal performance for five degrees of sideslip was attained when the processed angle of attack signal was multiplied by a factor of two. Therefore, when normalized relative to five degrees, a value of $C_W$ equal to 0.4 was utilized.

In viewing FIG. 5, it can be noted that the signal processing utilized in generating the ground effects rudder compensation signal is substantially identical to the signal processing for generating the ground effects wheel compensation. That is, the ground effects rudder compensation arrangement of FIG. 5 includes a multiplier 130 to which a summing network 132 supplies a signal representative of the total commanded aircraft sideslip (the sum of the engine-out sideslip command and the alignment induced sideslip). A multiplier 134 supplies a signal to the second input of multiplier 130 that is determined on the basis of: (a) a schedule that relates changes in rudder position to aircraft angle of attack for flap settings 25° and 30° (indicated at block 136); (b) an altitude scale factor (indicated at block 138); and, (c) a constant $C_R$ indicated at block 140). Like the wheel compensation constant $C_W$, the constant $C_R$ is established for optimal system performance. In the previously mentioned embodiment of the invention a value of 0.4 (identical to the value of $C_W$) is employed.

Preferably, the schedules indicated in the above-discussed blocks 124 and 136 and the above-discussed altitude scale factors (blocks 126 and 138) are respectively established to take into account maximum change in wheel position and rudder position for the various flight conditions that make up the landing flight envelope. During development of the invention and the attendant determination of the above-discussed schedules and altitude factors, a number of landing conditions that define the flight envelope of the type of aircraft in which the invention was to be reduced to practice were considered. These landing conditions took into account the two conventional flap settings, maximum and minimum aircraft landing weights, maximum forward and aft center of gravity, nominal approach speed and two approach speeds that exceed nominal approach speed. Flight tests and flight simulations were conducted under these landing conditions with the aircraft being trimmed with sideslip at several altitudes between 100 feet and 2 feet landing gear altitude. The maximum wheel change and the maximum rudder change for each flight condition was recorded and used to develop the wheel compensation schedule (block 124); the rudder compensation schedule (block 136) and the two altitude scale factors (126 and 138).

The open loop rudder washout command (indicated at block 16 of FIG. 1) that is used in the currently preferred embodiments of the invention is illustrated by the arrangement of FIG. 6. In the arrangement of FIG. 6, a signal representative of the aircraft angle of attack (AOA) is processed (i.e., scheduled) in accordance with landing flap position in the manner described relative to generation of the engine-out side slip command signal (FIG. 2). More specifically, in the signal processing arrangement shown in FIG. 6, a multiplier 142 multiplies the angle of attack signal (AOA) by a multiplicative factor $A_1$ or a multiplicative factor $B_1$, depending upon the position of a switch 144. The product of the multiplicative factor ($A_1$ or $B_1$) and the angle of attack signal is supplied to a summing network 146 and added either to an additive factor $A_2$ or to an additive factor $B_2$, depending upon the setting of a switch 148.

In the diagram of FIG. 6, multiplicative factors $A_1$ and $B_1$ are indicated in blocks 150 and 152 and additive factors $A_2$ and $B_2$ are indicated in blocks 154 and 156. In practicing the invention in a digital flight control system, the multiplicative and additive factors can be stored in system memory and accessed during the processing interval in which the rudder washout command signal is determined. Alternatively, a look-up table memory arrangement can be utilized to store these multiplicative factors and additive factors as well as additional data points should it be necessary to establish an angle of attack schedule that is not linear for either or both of the aircraft flap settings.

As is indicated at block 158 of FIG. 6, selection of the appropriate multiplicative factor and additive factor is made on the basis of aircraft flap setting. In particular, for landing flap setting position 25° (i.e., flaps less than or equal to 27.5° in the detection shown at block 158), the signal provided by summing network 146 corresponds to $A_1 AOA + A_2$. When the landing flap setting is 30°, the signal provided by summing network 146 corresponds to $B_1 AOA + B_2$.

In view of the previously described arrangement of FIG. 2, it will be recognized that $A_1$ and $A_2$ in FIG. 6 respectively represent the slope and intercept values for a linear relationship that closely approximates the amount of rudder washout command signal necessary to counteract yawing moment during an automatic landing with an inoperative engine when the thrust of the remaining engines is retarded and the landing is being made with 25° flap setting. Similarly, $B_1$ and $B_2$ respectively are the slope and intercept values for a straight line approximation to the amount of rudder washout command necessary to counteract yawing moment caused by throttle retard of the remaining engines when aircraft flap setting is 30°.

The currently preferred manner of determining multiplicative and additive factors for the arrangement of FIG. 6 is similar to the previously described manner of obtaining other multiplicative factors, additive factors and schedules that define signal relationships that are used in the practice of the invention. In the case of determining multiplicative and additive factors for FIG. 6, the amount of rudder washed out at throttle retard is determined by trimming the aircraft with an engine failed and wings level for the previously mentioned flight conditions that make up the landing flight envelope for the aircraft of interest.

With continued reference to FIG. 6, the signal supplied by summing network 146 is coupled to a multiplier 149 and multiplied by a constant $C_1$ (indicated at block 151). Constant $C_1$ is selected by empirical or other means to optimize rudder washout performance at throttle retard. Currently the preferred value for $C_1$ for both four-engine and twin-engine aircraft is 0.5. The signal supplied by multiplier 149 then is multiplied by the engine-out multiplier discussed relative to FIGS. 2 and 3 (indicated by multiplier 153) to form an engine-out rudder washout command signal. This signal is then filtered by an arrangement that is shown in digital filter format in FIG. 6, to obtain a first order washout characteristic that in effect matches the engine retard characteristics of the aircraft in which the invention is employed.

More specifically, in the arrangement of FIG. 6, a switch 160 that is located at the output of the depicted filter maintains the output signal at a level of zero (indicated at block 162) until switch 160 is activated by a washout enable signal. In the currently preferred embodiments of the invention, the washout enable signal is provided only if an engine is inoperative and, in addition, a washout latch signal is present. In FIG. 6, the washout latch signal is provided by a logic circuit that includes an OR gate 164, an AND gate 166 and a signal delay unit which is indicated by Z-transform block 168. In this arrangement, one input terminal of OR gate 164 is connected for receiving a throttle retard signal that is equal to a logical one at the time of throttle retard. One input terminal of AND gate 166 is connected for receiving a rudder engage signal that is at logic level one as long as the aircraft rudder is engaged. Since the second input terminal of AND gate 166 is connected to the output terminal of OR gate 164, it can be recognized that the output of AND gate 166 will be set to logical one at the time of throttle retard. Since the output of AND gate 166 is coupled to the second input terminal of OR gate 164, via Z-transform block 168, the washout latch signal will remain at logic level one unless the rudder engage signal becomes logical zero (unless the rudder is disengaged). Specifically, Z-transform block 168 supplies a signal to the second input terminal of OR gate 164 that corresponds to the output signal supplied by AND gate 166 during the next most antecedent iteration of the signal processing sequence utilized to generate the engine-out rudder washout command signal. Thus, after the output of AND gate 166 is switched to the logical one state (at throttle retard) it will remain in that state (washout latch signal supplied), unless the rudder is disengaged.

In addition to controlling switch 160 to maintain the circuit output at zero until the time of throttle retard, the washout latch signal activates a switch 170 of FIG. 6. Prior to throttle retard, switch 170 couples the engine-out rudder washout command signal (supplied by multiplier 153) to an additive (+) input of a summing network 172 via a switch 174. Switch 174 remains closed unless the aircraft executes a go-around procedure. If go-around is initiated, switch 174 supplies a signal representative of zero (indicated at block 176) to the additive (+) input of summing network 172. Upon understanding the manner in which the filtering arrangement of FIG. 6 operates, it will be recognized that activation of go-around switch 174 (supplying a zero value to summing network 172) when a filtered rudder washout signal is being supplied causes the filtered engine-out rudder washout command signal (i.e., the output of the filter arrangement) to smoothly decrease to a value of zero.

Continuing with the description of the digital filter arrangement, the output of summing network 172 is coupled to an additive (+) input of a summing network 178 by means of a multiplier 180 that multiplies the output signal provided by summing network 172 by a constant $C_2$. Constant $C_2$ is of the form $C_2 = 1 - \exp(-DT/TEOUT)$ where DT represents the signal processing iteration period used in generating the engine-out rudder washout command signal, $\exp(-DT/TEOUT)$ represents raising the natural logarithm to the power defined by the expression contained in the parentheses, and TEOUT is a constant that determines the washout filter time constant.

Prior to the time at which throttle retard occurs, no additional signals are provided to summing networks 172 and 178. Also, as previously mentioned, switch 160 maintains the circuit output signal at zero. At the time of throttle retard, the washout latch signal is generated at the output of AND gate 166, thereby causing switches 160 and 170 to change state. Activation of switch 160 causes the signal then being supplied by summing network 178 to be supplied as the filtered engine-out rudder washout command signal and, in addition, connects both a subtractive (−) input of summing network 172 and an additive (+) input of summing network 178 to the filter output terminal via a signal delay unit (indicated in FIG. 6 by Z-transform block 179). Activation of switch 170 by the washout latch signal interrupts signal flow between multiplier 153 and the additive (+) terminal of summing network 172. Specifically, as is indicated in FIG. 6 by a Z-transform block 182, when throttle retard occurs, the additive (+) input of summing network 172 is supplied with a signal representative of the engine-out rudder washout command signal that was supplied by multiplier 153 during the next most antecedent signal processing iteration. Configured in this manner, with each subsequent iteration, the digital filter smoothly washes out the value of engine-out rudder command signal that was supplied by multiplier 153 at the time of throttle retard (first order lag function having a time constant that is determined by $C_2$).

In the currently preferred embodiments of the invention, the value of TEOUT, which controls the washout characteristic of the filter, is selected in view of the throttle retard altitude of the aircraft and to accommodate for variations in engine response characteristics to throttle command. In considering implementation of the invention in various twin-engine and four-engine aircraft, values of $C_2$ equal to 1.5 and 0.5 have been established.

As was previously mentioned, initiation of a single alignment maneuver at a predetermined altitude for relatively high crosswinds is a well known practice in the art. For example, in one automatic landing system that is currently used in aircraft manufactured by the assignee of this invention, high crosswind conditions result in introduction of up to 5° of sideslip at an altitude of 500 feet for crab angles in excess of five degrees. In this prior art system arrangement, no sideslip is introduced for crab angles of less than 5° and crab angles resulting from high crosswind conditions (crab angles greater than 5°) are not reduced below 5°. As also was previously mentioned, the currently preferred embodiments of the invention include provision for initiating a second-stage alignment maneuver. When combined with the prior art single stage alignment technique, the second-stage alignment of the invention results in decrabbing over a full range of crosswind conditions (light to relatively heavy).

In the currently preferred practice of the invention, the second stage of alignment maneuver is introduced at a predetermined altitude such as 200 feet. Thus, when the invention is practiced in the above-discussed prior art system, the resulting system can introduce up to 5 degrees of sideslip at an altitude of 200 feet.

Preferably, the two-stage alignment feature of the invention is operative during both a normal automatic landing (all engines operative) and during an engine-out automatic landing. When all engines are operative, the second-stage alignment provision of the invention has two potential effects. First, under high crosswind conditions in which the first stage alignment does not introduce a full 5° of sideslip, initiation of the second stage alignment maneuver will use what is left of the five-degree sideslip range, (i.e., 5° minus the sideslip introduced at the first stage) to better align the aircraft with the runway (further reduce crab angle). When light or moderate crosswinds are present (crab angles no greater than 5°; no first stage alignment), initiation of the second-stage alignment maneuver will introduce enough sideslip to place the aircraft in complete alignment with the runway.

Under engine-out landing conditions, the two-stage alignment procedure functions substantially the same manner described above. However, a special case is presented when crosswind is from the same side as the failed engine, since the engine-out sideslip introduced by the invention tends to decrab the aircraft. Thus, at 200 feet, the aircraft may already be aligned with the runway. Whether the aircraft is aligned with the runway or not, can be determined by comparing the previously discussed gust sideslip estimate (FIG. 4) with the engine-out sideslip command (FIG. 2). When the gust sideslip estimate is less than the engine-out sideslip command, the aircraft is aligned and no second-stage alignment maneuver is executed.

The embodiments of the invention in which an exclusive property or privilege is claimed are defined as follows:

1. A method for use in an aircraft flight control system of a multi-engine aircraft for execution of an automatic landing procedure when one of the engines of said aircraft is inoperative, said method comprising the steps of:
   processing signals representative of the angle of attack of said aircraft, the altitude of said aircraft and the landing flap setting aircraft to produce an engine-out sideslip command signals;
   detecting whether a crosswind condition exists in which the wind is from the same side of said aircraft as the location of said inoperative engine; and
   in the event said crosswind condition exists in which the wind is from the same side of said aircraft as the location of said inoperative engine, supplying said engine-out sideslip command signal in said flight control system to lower the wing on which said inoperative engine is mounted.

2. The method of claim 1 wherein said engine-out sideslip command signal is filtered and rate limited prior to said step of supplying said engine-out sideslip command signal in said flight control system.

3. The method of claim 1 wherein said step of producing an engine-out sideslip command signal includes the steps of:
   generating an engine-out multiplier signal of magnitude and polarity indicative of the location of said inoperative engine;
   generating a signal representative of the approximate amount of sideslip command signal necessary to level the wings of said aircraft; and
   multiplying said signal representative of the approximate amount of sideslip command signal necessary to level the wings of said aircraft by said engine-out multiplier signal.

4. The method of claim 3 further comprising the steps of:
   detecting whether a crosswind condition exists in which the wind is from the opposite side of said aircraft than the location of said inoperative engine;
   generating a gust estimate signal representative of crosswind induced crab angle;
   limiting said gust estimate signal to a value that does not exceed said signal representative of the approximate amount of sideslip command signal necessary to level the wings of said aircraft; and
   subtracting said limited gust estimate signal from said engine out sideslip command signal when said crosswind from said opposite side of said aircraft from the location of said inoperative engine.

5. The method of claim 4 wherein said engine-out sideslip command signal is filtered and rate limited prior to said step of supplying said engine-out sideslip command signal in said flight control system.

6. The method of claim 3, wherein said signal representative of said landing flap setting is indicative of whether said landing flap setting is a first or second predetermined setting and wherein said step of generating said signal representative of the approximate sideslip command signal necessary to level the wings of said aircraft includes the step of:
   detecting whether said landing flap is said first predetermined setting or said second predetermined setting;
   multiplying said signal representative of said angle of attack by a first multiplicative factor and adding to the product of said representative of said angle of attack and said first multiplicative factor a first additive factor when said landing flap setting is said first predetermined setting; and
   multiplying said signal representative of said angle of attack by a second multiplicative factor and adding to the product of said signal representative of said angle of attack and said second multiplicative factor a second additive factor when said landing flap setting is said second predetermined setting.

7. The method of claim 6 further comprising the steps of:
   detecting whether a crosswind condition exists in which the wind is from the opposite side of said aircraft and the location of said inoperative engine;
   generating a gust estimate signal representative of crosswind induced crab angle;
   limiting said gust signal to a value that does not exceed said signal representative of the approximate amount of sideslip command signal necessary to level the wings of said aircraft; and subtracting said limited gust estimate signal from said engine-out sideslip command signal when crosswind is from the opposite side of said aircraft from the location of said inoperative engine.

8. The method of claim 1 further comprising the step of processing said signals representative of aircraft angle of attack, altitude of said aircraft and landing flap setting to generate a lateral ground effects wheel compensation signal and a lateral ground effects rudder compensation signal when said aircraft is below an altitude substantially equal to the wingspan of said aircraft.

9. The method of claim 8 wherein said step generating a lateral ground effects wheel compensation signal and a lateral ground effects rudder compensation signal includes the steps of:

generating a signal representative of the ground effects wheel compensation required per degree of aircraft sideslip;

generating a signal representative of the ground effects rudder compensation required per degree of aircraft sideslip;

multiplying said signal representative of the ground effects wheel compensation required per degree of sideslip by said engine-out sideslip command signal and a signal representative of aircraft alignment induced sideslip to generate said lateral ground effects wheel compensation signal;

multiplying said signal representative of the ground effects rudder compensation required per degree of sideslip by said engine-out sideslip command signal and said signal respresentative of aircraft alignment induced sideslip.

10. The method of claim 1 further comprising the steps of:

detecting the time at which the throttles of the operative engines of said aircraft are retarded;

generating a rudder control signal representative of the approximate amount of rudder command signal required to counteract yawing moment of said aircraft when said operative engines are retarded;

filtering said rudder control signal with a first order washout filter to provide a rudder washout command signal; and supplying said rubber washout command signal to the rudder of said aicraft at the time at which said throttles of the operative engines of said aircraft are retarded.

11. The method of claim 6 wherein said first multiplicative factor and said first additive factor respectively represent the slope and intercept values of a linear relationship that approximates the amount of engine-out sideslip command signal necessary to level said wings of said aircraft when said landing flap setting is said first predetermined setting and said aircraft descends along a predetermined glideslope angle; and wherein said second multiplicative factor and said second additive factor respectively respresent the slope and intercept values of a linear relationship that approximates the amount of engine-out sideslip command signal necessary to level said wings of said aircraft when said landing flap setting is said second predetermined setting and said aircraft descends along said predetermined glideslope angle.

12. The method of claim 11 wherein both said linear relationships are established to account for various landing conditions that include aircraft weight, location of aircraft center of gravity and aircraft landing approach speed.

13. The method of claim 4 wherein said step of generating said gust estimate signal representative of crosswind induced crab angle includes the steps of:

generating a signal representative of the apparent crab angle of said aircraft by subtracting a signal representative of aircraft heading from a signal representative of aircraft track;

processing a signal representative of lateral acceleration of said aircraft to provide a signal representative of sideslip induced crab angle;

processing signals representative of aircraft rudder position and rudder ratio changer correction to provide a signal representative of the crab angle resulting from the compensated rudder position of said aircraft; and combining said signal representative of the apparent crab angle of said aircraft with said signals representative of sideslip induced crab angle and crab angle resulting from the compensated rudder position of said aircraft.

14. The method of claim 13 wherein said step of combining said signals includes the steps of adding to said signal representative of the apparent crab angle of said aircraft said signal representative of said sideslip induced crab angle and subtracting said signal representative of crab angle resulting from the compensated rudder position of said aircraft.

15. The method of claim 9 wherein said step of generating said signal representative of the ground effects wheel compensation required per degree of aircraft sideslip includes the step of processing said signal respresentative of aircraft angle of attack in accordance with schedule relating said ground effects wheel compensation to said landing flap setting of said aircraft for the particular type of aircraft employing said aircraft flight control system; and wherein said step of generating a signal representative of the ground effects rudder compensation required per degree of aircraft sideslip includes the step of processing said signal representative of said aircraft angle of attack in accordance with a schedule relating said ground effects rudder compensation to said aircraft landing flap setting for the particular type of aircraft employing said aircraft flight control system.

16. The method of claim 8 further comprising the steps of:

detecting the time at which the throttles of the operative engines of said aircraft are retarded;

generating a rudder control signal representative of the approximate amount of rudder command signal required to counteract yawing moment of said aircraft when said operative engines are retarded;

filtering said rudder control signal with a first order washout filter to provide a rudder washout command signal; and supplying said rudder washout command signal to the rudder of said aircraft at the time at which said throttles of the operative engines of said aircraft are retarted.

17. The method of claim 10 further comprising the step of processing said signals representative of aircraft angle of attack, altitude of said aircraft and landing flap setting to generate a lateral ground effects wheel compensation signal and a lateral ground effects rudder compensation signal when said aircraft is below an altitude substantially equal to the wingspan of said aircraft.

18. The method of claim 17 wherein said step of generating a lateral ground effects wheel compensation signal and a lateral ground effects rudder compensation signal includes the steps of:
  generating a signal representative of the ground effects wheel compensation required per degree of aircraft sideslip;
  generating a signal representative of the ground effects rudder compensation required per degree of aircraft sideslip;
  multiplying said signal representative of the ground effects wheel compensation required per degree of sideslip by said engine-out sideslip command signal and a signal representative of aircraft alignment induced sideslip to generate said lateral ground effects wheel compensation signal;
  multiplying said signal representative of the ground effects rudder compensation required per degree of sideslip by said engine-out sideslip command signal and a signal representative of aircraft alignment induced sideslip to generate said lateral ground effects rudder compensation signal.

19. An aircraft flight control system for automatically landing multi-engine aircraft having an inoperative engine, said flight control system comprising:
  engine-out detection means for determining that an engine of said aircraft is inoperative and for indentifying said inoperative engine relative to the mounting location of said inoperative engine, said engine-out detection means supplying a signal representative of said mounting location of said inoperative engine;
  signal processing means responsive to said signal supplied by said engine-out detection means and responsive to signals representative of the angle of attack of said aircraft and the landing flap setting of said aircraft during an automatic landing procedure; said signal processing means being operable during said automatic landing procedure to detect crosswind conditions under which the wind is from the same side of said aircraft as said mounting location of said inoperative engine and, upon detection of said crosswind location, being operable for supplying to the flight control surfaces of said aircraft an engine out sideslip command signal representative of the amount of sideslip required to lower the upwind wing of said aircraft to a position in which said upwind wing is not higher than the downwind wing of said aircraft.

20. The aircraft flight control system of claim 19 wherein said signal processing means includes:
  means for processing said signal representative of said landing flap setting to determine whether said automatic landing procedure is being executed with a first predetermined landing flap setting or a second predetermined landing flap setting;
  means responsive to said signal representative of said aircraft angle of attack for producing a first scheduled sideslip signal when said landing flap setting is said first predetermined landing flap setting and for supplying a second scheduled sideslip signal when said landing flap setting is said second predetermined landing flap setting; and
  means for multiplying said first scheduled sideslip signal by said signal representative of said mounting location of said inoperative engine to generate said engine-out sideslip command signal when said landing flap setting is said first predetermined landing flap setting and for multiplying said second scheduled sideslip signal by said signal representative of said mounting location of said inoperative engine to generate said engine-out sideslip command signal when said landing flap setting is said second predetermined landing flap setting.

21. The aircraft flight control system of claim 20 wherein said means for supplying said first scheduled sideslip signal includes means for multiplying said signal representative of said aircraft angle of attack by a first multiplicative factor and adding to the product of said signal representative of said aircraft angle of attack and said first multiplicative factor a first additive factor; and wherein said means for supplying said second scheduled sideslip signal includes means for multiplying said signal representative of said aircraft angle of attack by a second multiplicative factor and adding to the product of said signal representative of said aircraft angle of attack and said second mulitplicative factor a second additive factor.

22. The flight control system of claim 20 further comprising digital filtering means for filtering and rate limiting said engine-out sideslip command signal.

23. The flight control system of claim 20 wherein said signal processing means is further responsive to signals representative of aircraft body lateral acceleration, aircraft rudder position, rudder ratio changer correction, aircraft track and aircraft heading for producing a gust sideslip estimate signal representative of crosswind induced crab angle of said aircraft; said signal processor means including means for detecting crosswind conditions under which the wind is from the opposite side of said aircraft as said mounting location of said inoperative engine; said signal processing means further including means for limiting the magnitude of said gust sideslip estimate signal to the magnitude of said first scheduled sideslip signal when said automatic landing procedure is being executed with said first predetermined landing flap setting and for limiting the magnitude of said gust sideslip estimate signal at the magnitude of said second scheduled sideslip signal when said automatic landing procedure is being executed with said second predetermined landing flap setting; said signal processing means further including means for subtracting the limited gust sideslip estimate signal from said engine-out sideslip command signal when the wind is from the opposite side of said aircraft as said mounting location of said inoperative engine.

24. The flight control system of claim 23, wherein said signal processing means further includes means for generating a lateral ground effects wheel compensation signal that is supplied to the ailerons of said aircraft when said aircraft is below a predetermined altitude and is executing said automataic landing procedure with said inoperative engine and for supplying a lateral ground effects rudder compensation to the rudder of said aircraft when said aircraft is below said predetermined altitude and is executing said automatic landing procedure with said inoperative engine; said means for supplying said lateral ground effects wheel compensation signal and said lateral ground effects rudder compensation signal including means for processing said signals representative of said aircraft angle of attack, said landing flap setting and the altitude of said aircraft to supply a signal representative of the ground effects wheel compensation required per degree of sideslip for the type of aircraft employing said flight control system and for supplying a signal representative of the ground effects rudder compensation required per degree of sideslip; said means for supplying said lateral ground effects wheel compensation signal and said lateral ground effects rudder compensation signal further including scaling means for receiving said signal representative of the ground effects wheel compensation required per degree of sideslip for the type of aircraft employing said flight control system and for receiving said signal representative of the ground effects rudder compensation required per degree of sideslip, said scaling means for multiplying said signal representative of the ground effects wheel compensation required per degree of sideslip and said signal representative of the ground effects rudder compensation required per degree of sideslip by a signal representative of the total commanded sideslip.

25. The flight control system of claim 24 further comprising means responsive to a signal indicating throttle retard of the operative engines of said aircraft during said automatic landing procedure with said inoperative engine and a signal indicating the rudder of said aircraft is engaged with said flight control system during said automatic landing procedure for supplying a rudder washout latch signal; and wherein signal processing means further includes means responsive to said signal representative of said aricraft angle of attack and said signal representative of said landing flap setting for supplying a rudder washout command signal to said rudder of said aircraft when said rudder washout latch signal is supplied by said means for supplying said rudder washout signal.

26. The flight control system of claim 25 wherein said means for supplying said rudder washout command signal includes means for scheduling said representative of said aircraft angle of attack in accordance with said landing flap setting and means for multiplying the scheduled aircraft angle of attack signal by said signal representative of said mounting location of said inoperative engine to produce a product signal; said means for supplying said rudder washout command signal further including means for digital filtering said product signal in accordance with a first order washout filter function.

27. The flight control system of claim 23 further comprising means responsive to a signal indicating throttle retard of the operative engines of said aircraft during said automatic landing procedure with said inoperative engine and a signal indicating the rudder of said aircraft is engaged with said flight control system during said automatic landing procedure for supplying a rudder washout latch signal; and wherein signal processing means further includes means responsive to said signal representative of said aircraft angle of attack and said signal representative of said landing flap setting for supplying a rudder washout command signal to said rudder of said aircraft when said rudder washout latch signal is supplied by said means for supplying said rudder washout signal.

28. The flight control system of claim 27, wherein said signal processing means further includes means for generating a lateral ground effects wheel compensation system that is supplied to the ailerons of said aircraft when said aircraft is below a predetermined altitude and is executing said automatic landing procedure with said inoperative engine and for supplying a lateral ground effects rudder compensation to the rudder of said aircraft when said aircraft is below said predetermined altitude and is executing said automatic landing procedure with said inoperative engine; said means for supplying said lateral ground effects wheel compensation signal and said lateral ground effects rudder compensation signal including means for processing said signals representative of said aircraft angle of attack, said landing flap setting and the altitude of said aircraft to supply a signal representative of the ground effects wheel compensation required per degree of sideslip for the type of aircraft employing said flight control system and for supplying a signal representative of the ground effects rudder compensation required per degree of sideslip; said means for supplying said lateral ground effects wheel compensation signal and said lateral ground effects rudder compensation signal further including scaling means for receiving said signal representative of the ground effects wheel compensation required per degree of sideslip for the type of aircraft employing said flight control system and for receiving said signal representative of the ground effects rudder compensation required per degree of sideslip, said scaling means for multiplying said signal representative of the ground effects wheel compensation required per degree of sideslip and said signal representative of the ground effects rudder compensation required per degree of sideslip by a signal representative of the total commanded sideslip.

* * * * *

UNITED STATES PATENT AND TRADEMARK OFFICE
CERTIFICATE OF CORRECTION

PATENT NO. : 5,113,346

DATED : May 12, 1992

INVENTOR(S) : M. Orgun et al.

It is certified that error appears in the above-identified patent and that said Letters Patent is hereby corrected as shown below:

| COLUMN | LINE | |
|---|---|---|
| 15 (Claim 1, line 8) | 58 | after "setting" insert --of said-- |
| 16 (Claim 6, line 7) | 44 | "step" should read --steps-- |
| 16 (Claim 6, line 8) | 45 | after "flap" insert --setting flap-- |
| 16 (Claim 7, line 8) | 67 | after "gust" insert --estimate-- |
| 17 (Claim 7, line 13) | 4 | after "when" insert --said-- |
| 17 (Claim 11, line 10) | 60 | "respresent" should read --represent-- |
| 19 (Claim 19, lines 5&6) | 29 & 30 | "inden-tifying" should read --identifying-- |

UNITED STATES PATENT AND TRADEMARK OFFICE
CERTIFICATE OF CORRECTION

PATENT NO. : 5,113,346  
DATED : May 12, 1992  
INVENTOR(S) : M. Orgun et al.

It is certified that error appears in the above-indentified patent and that said Letters Patent is hereby corrected as shown below:

| COLUMN | LINE | |
|---|---|---|
| 20 (Claim 21, line 13) | 21 | "mulitplicative" should read --multiplicative-- |
| 21 (Claim 26, line 3) | 36 | after "said" insert --signal-- |

Signed and Sealed this

Fourteenth Day of September, 1993

Attest:

BRUCE LEHMAN

*Attesting Officer*     *Commissioner of Patents and Trademarks*